F. SIMONE.
FIRE EXTINGUISHER.
APPLICATION FILED MAR. 23, 1917.

1,242,254.

Patented Oct. 9, 1917.
2 SHEETS—SHEET 1.

Inventor
Frank Simone
By his Attorney

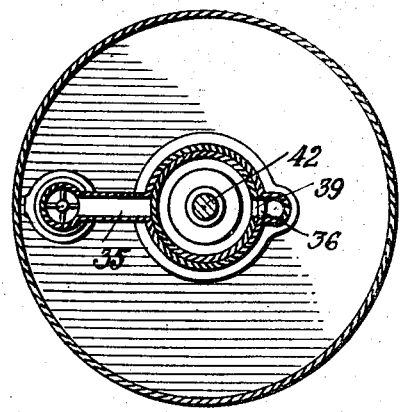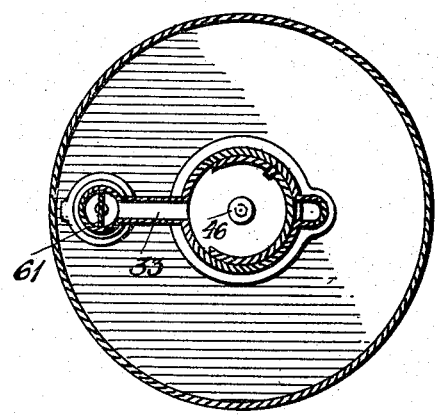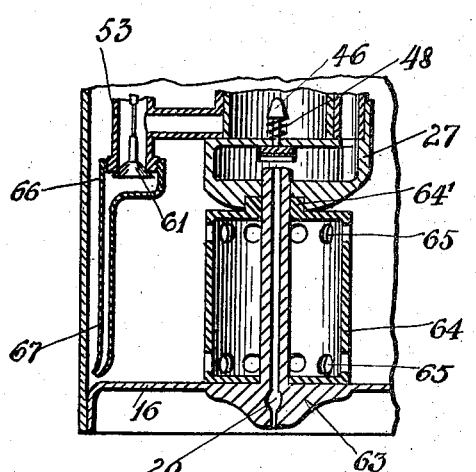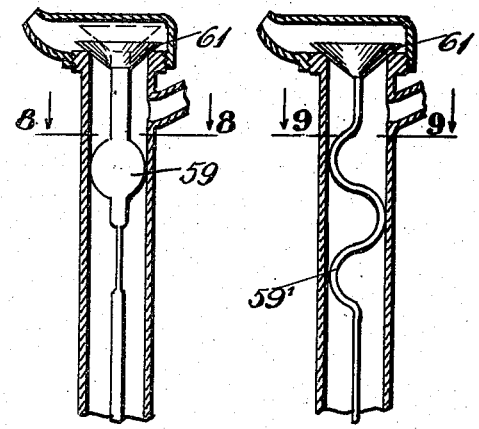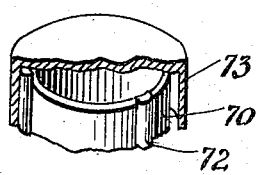

UNITED STATES PATENT OFFICE.

FRANK SIMONE, OF NEW YORK, N. Y.

FIRE-EXTINGUISHER.

1,242,254.  Specification of Letters Patent.  Patented Oct. 9, 1917.

Application filed March 23, 1917. Serial No. 156,852.

*To all whom it may concern:*

Be it known that I, FRANK SIMONE, a citizen of the United States, residing at New York, in the county of New York and State of New York, have invented new and useful Improvements in Fire-Extinguishers, of which the following is a specification.

This invention relates to fire-extinguishers, and the main objects of the same are to provide a new and novel arrangement of the pumping mechanism including a slidable casing for the piston; to provide an improved arrangement of floating valves in conjunction with the pumping mechanism whereby to enable the fluid to be drawn from the lowermost point of the container, irrespective of whether the extinguisher is inclined upwardly or downwardly; to provide an improved arrangement of the pumping mechanism and coöperating floating valve mechanism so that the same may revolve together on an axis, permitting the floating valve mechanism to fall always by gravity to the lower side of the container; and to provide a novel insertion-extension so that containers made in larger size, may employ the same standardized pumping mechanism and floating valve mechanism.

With the foregoing and other objects in view, which will become more apparent as the description progresses, the invention resides in the construction, combination and arrangement of parts hereinafter described and shown in the accompanying drawings, forming a material part of this specification, and in which:—

Fig. 3 is a cross sectional view, taken on the line 3—3 of Fig. 2.

Fig. 4 is a similar view, taken on the line 4—4 of Fig. 2.

Fig. 5 is a sectional view of a fragmental portion of my extinguisher, illustrating in particular the application of the insertion-extension.

Fig. 6 is a fragmental view, partly in section, illustrating the preferred form of floating valve mechanism.

Fig. 7 is a similar view, illustrating another or modified form of floating valve mechanism.

Fig. 8 is a cross sectional view, taken on the line 8—8 of Fig. 6.

Fig. 9 is a similar view, taken on the line 9—9 of Fig. 7.

Fig. 10 is a fragmental perspective view, partly in section, illustrating the arrangement of parts for the admission of air.

Figure 1:
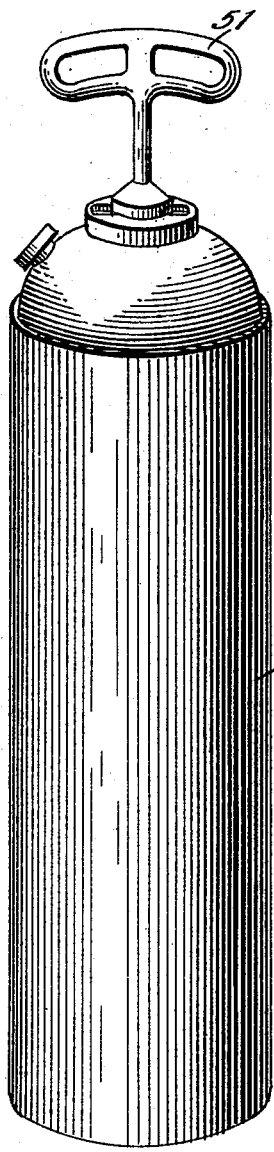
Figure 1 is a view in perspective of the exterior of my fire-extinguisher.

My improved fire-extinguisher embodies an outside casing 15, which is made preferably cylindrical in form, although other forms may be employed with good results. This casing is made to form part of a container by securing to the front and rear ends thereof, the caps or end closures 16 and 17, respectively. These caps are formed preferably with outwardly projecting flanges (Fig. 2), which engage liquid tight the inner periphery of the casing 15, to which they are secured. Centrally formed with the front cap 16 is a nozzle 18 having a shouldered and reduced inner end 19, the nozzle being provided with a suitable liquid discharging aperture 20.

With the rear cap 17 is formed a central hub portion or bushing 21 having an outside flange 22, into which is fitted an outer cap plate 23 having a central opening 24 therethrough in communication with a pair of alined radial slots 25. The hub portion 21 is also provided with a circular opening 26 concentric with the opening 24 but of smaller diameter.

Revolubly mounted upon the reduced portion of the nozzle 18 is a fitting 27 formed with an interior chamber 28 having at one side an inlet opening 29. Revolubly mounted within the opening 26, of the hub portion 21, is a fitting 30 having an inwardly projecting flange, the said fitting being formed also with a central cut out portion adapted to receive packing as 31 to provide a fluid-tight connection with the piston rod.

Threaded into the flange of the fitting 30 at one end, and rigidly secured to the inner face of the fitting 27 at the other end, is a cylindrical casing 32 which is provided at its front end with the ports or apertures 33 and 34, located in different transverse planes, and also at the rear end with parts 35 and 36 similarly located.

Slidably fitted within the casing 32 is a casing 37, the ends of which are open, and which is shorter in length than the casing 32, and having provided on the same side thereof adjacent its front and rear ends, the ports or apertures 38 and 39, respectively. The length of the slidable casing 37 is such that when it clears the port 33, the port 35 at the rear end will be closed, and conversely. It should also be noticed here that when the port 33 is cleared, communication between the ports 34 and 38 is closed, while that between the ports 36 and 39 is open and conversely, that when communication between the ports 34 and 38 is opened with the opening of port 35, the ports 36 and 39 are closed. In order to enable the inner casing 37 to slide without turning, it is provided at its front end, with a longitudinal slot 40, in which is entered a pin 41, rigid with the outer casing.

Reciprocable within the inner casing 37, and through the openings 26 and 24, is a piston rod 42 having a piston head 43, which is in such tight engagement with the inner casing 37 that when the piston rod is moved, the inner casing is also moved accordingly to the full extent to which its length permits, the piston being capable of further movement after the casing is brought to rest, the purpose of which is to open and close the openings as hereinbefore described.

Fastened at one end of the piston head 43 so as to project centrally in advance of the same, is a coil spring 44 carrying a cup member 45 adapted to engage the head of the pin 46 which slidably pierces the rear wall of the fitting 27, the said pin rigidly carrying in advance of said wall, a cup member 47, which is designed to engage the discharge aperture 20 of the nozzle, closing the same against the passage of fluid, when the piston is locked against movement. A spring element 48, carried upon the pin 46, is designed to normally maintain the cup 47 out of engagement with the nozzle for the passage of fluid. Thus I arrange for the opening of the nozzle for the discharge of the fluid by the retraction of the piston rod, the outside end of said rod being provided with a cap-fitting 49 having a cavity on its inner side for retaining packing as 50, and also having outwardly projecting lugs adapted to snugly engage the underside of the cap plate 23 by the turning of the key handle 51.

To provide communication between the chamber on the rear side of the piston head 43 with the chamber on the front side thereof and also with the inlet port 29 provided in the said fitting 27, is a pipe 52.

Figure 2:
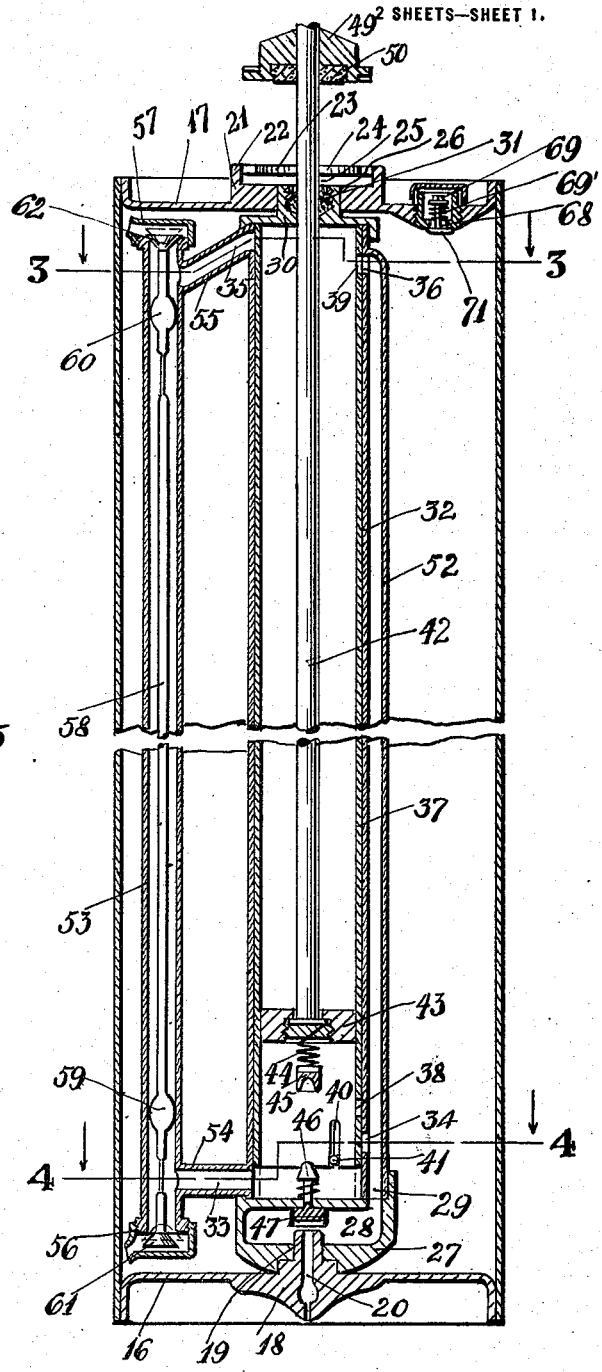
Fig. 2 is a longitudinal sectional view through my fire-extinguisher.

To provide for the suction of the liquid from the lowest point of the container, when the piston is actuated, I provide a suction pipe 53 which is in communication with the ports 33 and 35 by means of the pipes 54 and 55 respectively. Fitted upon the opposed ends of the suction pipe 53 are valve housings 56 and 57, each having an orifice opening toward the corner produced by the union of the exterior casing with the end cap. Extending through the suction pipe is a rod 58 which is provided with the guide members 59 and 60, the opposite ends of said rod being equipped with the floating valves 61 and 62 adapted to seat against the ends of the suction tube to close communication therewith, the said valves being so spaced that when one opening is closed the other will be open. While, in order to permit the passage of the fluid through the suction pipe 53, I prefer to employ the form of guide-members as 59 and 60, as indicated in Figs. 2 and 6, yet the modified form 59', illustrated in Fig. 7, also permits the passage of the fluid and brings about good results.

In Fig. 5, I illustrate the means by which I can produce a larger container to hold a greater quantity of fluid without changing the form and construction of the operating elements. To accomplish this, I make a larger nozzle 63 and rigidly mount thereupon a cylindrical fitting 64, having a reduced hub-like inner end 64' upon which, as well as upon the inner end of the said nozzle, is rotatably mounted the end of the fitting 27. Under this construction the cup 47 seats against the inner end of the nozzle to close the discharge aperture 20 by means of the locking manipulation of the handle 51 as before. The cylinder-like member 64 is provided with a plurality of apertures as 65 to enable the liquid to enter the same, thereby utilizing all space available in the container. Under this construction too, instead of attaching a valve housing as 56 to the front end of the suction pipe 53, I attach a housing 66 having, preferably integral therewith, a tube 67, which opens as before into the corner produced by the union of the casing 15 with the end cap 16, whereby to suck the liquid from the lowest point.

The cap 17 is provided with a filler opening 68, which is held normally closed by means of a spring actuated plug 69, the spring being seated upon an inserted bushing 70, whereby to hold the disk valve 71 tight against the bushing. As best illustrated in Fig. 10, the projecting end of bushing 70 is formed with exterior ribs 72, upon which rests a cap 73 so as to provide sector-like spaces between the exterior of the bushing 70 and the interior side of the cap 73 for the admission of air, when the air pressure within the container is less than that of the outside atmosphere, it being observed in this connection that the tension of the spring 69' is merely sufficient to maintain the disk 71 tight against the bushing when the air pressure within the container is substantially equal to that of the outside atmosphere.

The operation of my improved fire-extinguisher is as follows: By turning the handle 51, the cap 49 is released from the retaining plate 23, which operation allows the piston to be reciprocated in the slidable cylinder. As the piston is drawn upwardly the slidable cylinder is drawn with it until stopped by the fitting 30, thus enabling the liquid to pass through the ports 33 and 39, and preventing its passage through the ports 35 and 38 as hereinbefore described. Simultaneously with the upward movement of the piston, the floating valve 61 being open, assuming the extinguisher inclined downwardly, the fluid is sucked into the chamber created in advance of the piston. Simultaneously, also, with the upward movement of the piston, the fluid is forced through the pipe 52 and cavity 28 out through the aperture 20 of the nozzle.

When the piston is moved downwardly carrying with it, until stopped by the fitting 27, the sliding casing 37, port 33 is closed and port 38 is opened, and also port 39 is closed and port 35 opened, so that the liquid is forced from the cavity in advance of the piston out through the nozzle, while into the cavity behind the piston the liquid is drawn by suction from the suction pipe 53. When the extinguisher is inclined upwardly, the operation is substantially the same except that the floating valve 56 is closed while floating valve 57 is opened, this action being accomplished by gravity.

Having thus described my invention, what I claim is:—

1. A device of the character described, including a container having a nozzle at one end, a casing rotatably mounted between the nozzle and the opposite end of the container, said casing having an inlet and an outlet at each end thereof, the outlet ports being in different transverse planes from the inlets, a compartment provided at one end of the casing in communication with the discharge aperture of the nozzle, a pipe providing communication between the outlets and said compartment, a casing shorter in length than the rotatable one sliding in the rotatable casing and adapted alternately to open and close the inlets, said slidable casing having outlets adapted to register alternately with the outlets in said rotatable casing, a piston slidably mounted in the slidable casing and adapted to move the same within its limits, and a device rotatable with the rotatable casing and communicating with the inlets thereof, whereby to control the admission of liquid thereinto as the piston is reciprocated.

2. A device of the character described, including a container having a discharge nozzle in one end, a fitting having a compartment in communication with the discharge outlet of the nozzle rotatable on said nozzle, a casing having one end fast with said fitting and its other end rotatable in the opposite end of the container, said casing having an inlet port and an outlet port at each end thereof, the outlet ports being in different transverse planes from the inlet ports, a pipe arranged alongside the rotatable cylinder permitting communication between the outlet ports and the said compartment, a casing slidable in the rotatable casing and slightly shorter in length than the same to permit limited longitudinal movement whereby to alternately open and close the inlet ports, a piston arranged in said slidable casing to actuate the same within its limits and movable beyond the limited movement thereof, and a suction mechanism connected to and rotatable with the rotatable casing and having communication with the inlet ports thereof, said suction mechanism being adapted to control the admission of liquid from the lowest point of the container regardless of the inclined position when the piston is actuated.

3. A device of the character described, comprising a container having a discharge nozzle in one end and a bushing in the other end, an inner container journaled for rotation between said nozzle and said bushing, a separate compartment in said rotatable container adjacent said nozzle to provide communication with the discharge aperture thereof, said rotatable container further having an inlet port and an outlet port at each end thereof, the outlet ports being in different transverse planes from the inlet ports, a cylinder having open ends snugly arranged in said rotatable container, said cylinder being shorter in length than the rotatable container and being adapted to have limited movement therein to open and close alternately the inlet ports thereof, outlet ports in said slidable cylinder to register alternately with the outlet ports of said rotatable container, a piston arranged in said slidable cylinder adapted to move the same within its limits, the piston being adapted to have movement beyond the limits of the movement of said cylinder, a suction pipe attached to the rotatable container and communicating with the inlet ports thereof, a valve housing for each end of the suction pipe with an orifice confronting the inner walls of the container, a valve arranged in each housing, a stem connecting the valves so as to alternately open and close them and means combined with the stem to guide the direction of movement of the same.

4. In a device of the character described, the combination with a container including a discharge nozzle at one end thereof, of a cylinder rotatably mounted in the container, said cylinder having a compartment in communication with the discharge aperture of the nozzle, also having an inlet and an outlet port at each end thereof, the outlet ports being in different transverse planes from the inlet ports, a cylinder having open ends slidable in the rotatable cylinder, and adapted alternately to close the inlet ports thereof, outlet ports in the slidable cylinder to register alternately with the outlet ports of the rotatable cylinder, a pumping mechanism for reciprocating said movable cylinder, and a fluid control valve mechanism carried by said rotatable cylinder and in communication with the inlet ports thereof whereby to control the admission of liquid as the piston is actuated.

In testimony whereof I have signed my name to this specification.

FRANK SIMONE.

Copies of this patent may be obtained for five cents each, by addressing the "Commissioner of Patents, Washington, D. C."